F. G. LEWIS.
STEERING MECHANISM.
APPLICATION FILED JUNE 23, 1919.

1,400,689. Patented Dec. 20, 1921.

Inventor
Fred G. Lewis

By Herbert E. Smith
Attorney

UNITED STATES PATENT OFFICE.

FRED G. LEWIS, OF SPOKANE, WASHINGTON, ASSIGNOR TO RHODES HARVESTER COMPANY, OF SPOKANE, WASHINGTON.

STEERING MECHANISM.

1,400,689. Specification of Letters Patent. Patented Dec. 20, 1921.

Application filed June 23, 1919. Serial No. 306,047.

*To all whom it may concern:*

Be it known that I, FRED G. LEWIS, a citizen of the United States, residing at Spokane, in the county of Spokane, and State of Washington, have invented certain new and useful Improvements in Steering Mechanisms, of which the following is a specification.

The present invention relates to improvements in steering mechanism adapted especially for use in connection with tractors or tractor machines employing the endless belt type of driving traction members, and which are steered by retarding the traction belt at one side of the machine while permitting the belt at the other side to proceed normally, thus turning the vehicle in the direction of the retarded driving belt.

The invention is of unusual value in its application to agricultural implements whereby a plow for instance may be manipulated and made to travel in a straight line, or turned with facility, by quick manipulation of the parts and their direct and accurate response. In many implements of this character in which a driving clutch is thrown out of gear at one side of the machine and then a brake applied at the same side, the expenditure of unnecessary time and labor is required, and it becomes difficult to maintain the machine in a straight line without continuous manipulation of levers, etc. By the utilization of the mechanism of the present invention, both clutches employed, by a slight movement of the single steering wheel required, may be disengaged or engaged, successively by the driver to maintain the proper travel of the implement, and when a turn is to be made, the only manipulation necessary is a greater movement of the steering wheel.

In the accompanying drawings one complete example of the physical embodiment of the invention is illustrated in connection with a motor vehicle of the farm tractor type, without the front steering wheels or truck, and the steering mechanism is applied to the two endless traction belts and their connections through a pair of friction clutch devices on the sectional driving shaft, the parts being combined and arranged according to the best and simplest mode I have so far devised for the practical application of the principles of the invention.

Figure 1:
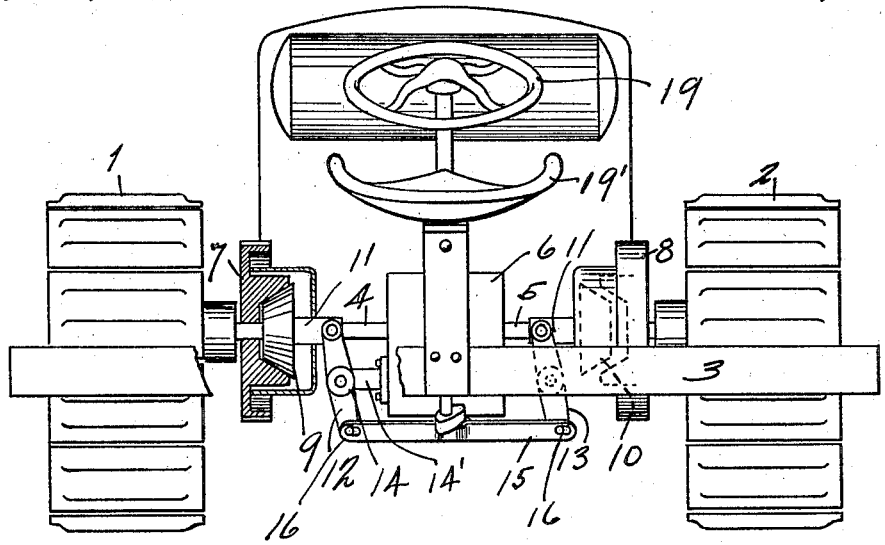
Figure 1 is a view in elevation showing so much of a farm tractor of this peculiar type, as is necessary to illustrate the connection therewith of the present steering mechanism.
Figure 2:
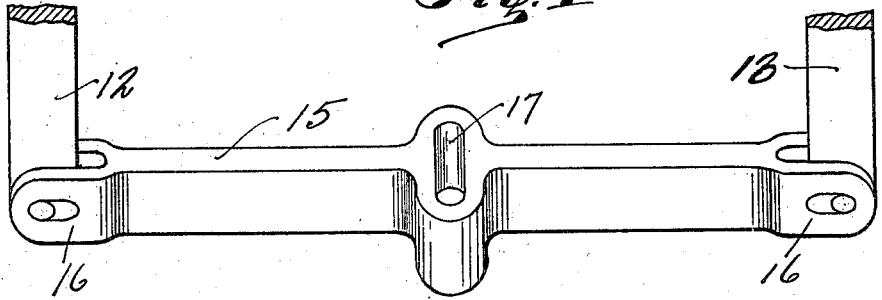
Fig. 2 is an enlarged, detail view of the steering bar which connects the steering post with the clutches, one at each side of the machine for the respective driving belts.

The two driving belts or endless tracks of the tractor machine are designated 1 and 2 and as they form no part of the present invention, these may well be of any usual and acceptable type, as is also the frame 3 of the tractor, and other elements that do not require specific reference herein.

The transverse driving shaft comprising the two sections 4 and 5, and the differential connections within the housing 6 may be of approved type, and these shaft sections each have a fixed clutch member, as 7 and 8 continuously revolving with them when the shaft is driven, and with these two fixed members, the loose, slidable conical clutch members 9 and 10 are adapted to co-act, the frictional contact of the respective cones serving to retard the shaft at the selected side of the machine, as desired.

Each clutch cone has a slide sleeve 11 integral therewith and movable on the shaft sections, laterally, and to these sleeves the clutch levers 12 and 13 are pivoted at one end, the fulcrum of these levers being designated at 14 on the fixed brackets 14' attached to the housing 6 or other suitable support.

The two levers extend downwardly beneath the frame of the machine and their free ends are connected by the steering bar 15 which extends transversely of the machine and equidistant of its longitudinal center, and is hung or suspended on these levers by its forked ends 16 which have suitable pivotal connection with the levers as shown.

Figure 3:
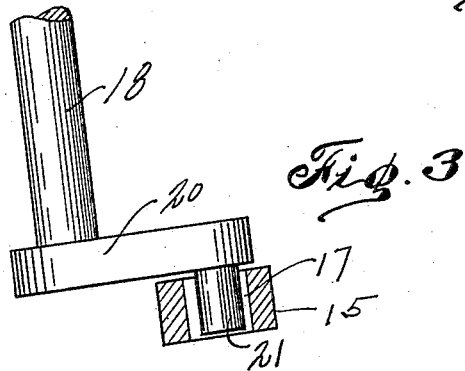
Fig. 3 is a detail view showing the connection between the steering post and the steering bar, or transverse connection bar between the clutches.

At its longitudinal center, the steering bar has a transversely extending bearing slot 17 which extends longitudinally of the machine, and is arranged a little oblique to the vertical to be alined in the same plane as the steering post 18 of the motor vehicle. The steering post is of usual type, supported to turn in the frame and may be turned by the operator through the medium of the steering wheel 19, the driver occupying the seat 19' situated conveniently for manipulating the steering wheel. The rotary motion of the wheel and post is transmitted to the transversely reciprocable steering bar through the medium of the crank arm 20 on the lower end of the post and the crank pin 21 on the underside of the crank arm, the pin fitting loosely in the slot as shown in Fig. 3.

The operation of the mechanism is apparent, and it need only be stated that by the manipulation of the steering wheel and post, the two cones of the two clutches will be affected simultaneously, one for closer frictional contact with the clutch cup and the other with less frictional contact. Thus in Fig. 1 the steering wheel and post have been turned to the right, or clockwise, and the left cone 9 is closely engaged with its bearing cup or clutch member 7, while the clutch at the other side of the machine is disengaged, the result being that the driving belt 1 at the left is retarded and the machine will be turned to the left due to the continued operation of the right traction belt 2. The turn to the right is made by a reverse movement of the steering wheel and post.

In maintaining a straight course for the motor vehicle or tractor machine, the normal position of the steering mechanism is neutral, with neither cone engaged, but by a slight movement of the wheel in either direction required a slight frictional contact may be made to turn the vehicle if it is deviating from its true course, and of course the steering of the vehicle is the same, whether the turn is great or small, the only movement necessary being the actuation of the wheel, to a great or lesser degree.

What I claim is—

1. The combination with the sectional driving shaft, the driving traction members operated thereby and the fixed clutch cups thereon, of slidable, non-rotatable cones on the shafts to co-act with the cups, clutch levers pivoted on the slidable cones, a steering bar pivotally connecting the levers, a steering wheel and post and operative connections between the post and bar for engaging selectively the clutches.

2. The combination of a sectional driving shaft and friction clutch devices comprising rotatable and non-rotatable members, pivoted levers on the non-rotatable members and a transversely slotted steering bar connecting said levers, a steering wheel and post, a crank arm on the post, and a crank pin on the arm loosely engaging the slotted steering bar.

In testimony whereof I affix my signature.

FRED G. LEWIS.